US006801365B2

(12) United States Patent
Nakamura et al.

(10) Patent No.: US 6,801,365 B2
(45) Date of Patent: Oct. 5, 2004

(54) PROJECTION TYPE IMAGE DISPLAY SYSTEM AND COLOR CORRECTION METHOD THEREOF

(75) Inventors: Tomoyuki Nakamura, Hachioji (JP); Toru Wada, Niiza (JP); Kensuke Ishii, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/309,848

(22) Filed: Dec. 4, 2002

(65) Prior Publication Data

US 2003/0117714 A1 Jun. 26, 2003

(30) Foreign Application Priority Data

Dec. 5, 2001 (JP) ........................................ 2001-371786

(51) Int. Cl.[7] .............................................. G02B 3/00
(52) U.S. Cl. ........................................ 359/649; 382/167
(58) Field of Search ................................ 359/649–651; 348/223.1, 645, 655–657, 742, 744, 776, 778, 779, 781, 786; 358/518, 523; 382/162, 167

(56) References Cited

U.S. PATENT DOCUMENTS 5,315,378 A * 5/1994 Satou et al. ................. 348/655
6,081,254 A * 6/2000 Tanaka et al. ............... 382/167
6,388,769 B1 * 5/2002 Hidaka ......................... 358/1.9

FOREIGN PATENT DOCUMENTS

| JP | 7284120 | 10/1995 |
| JP | 7121129 | 12/1995 |
| JP | 8292495 | 11/1996 |
| JP | 200154131 | 2/2001 |

\* cited by examiner

Primary Examiner—Jordan M. Schwartz
(74) Attorney, Agent, or Firm—Volpe and Koenig, P.C (57) ABSTRACT

There is provided a projection type image display system comprising color image displaying means for displaying an image to be projected onto a screen, means for storing a correlation between an initial XYZ-tristimulus value of an image projected onto the screen at the time of initial adjustment and an initial luminance value of the image projected onto the screen at the time of initial adjustment, luminance measuring means for measuring a maximum luminance value of each of primary colors of an image projected onto the screen upon lapse of a predetermined time from the initial adjustment, means for estimating an XYZ-tristimulus value of the image on the screen upon lapse of the predetermined time based on the maximum luminance value and the correlation, and means for calculating a color correction coefficient based on the estimated XYZ-tristimulus value.

9 Claims, 9 Drawing Sheets

| Item | Point |
|---|---|
| Repetition of ON/OFF within fixed time | 1 |
| Elapse of 50 operating hours | 2 |
| Sudden change in brightness within fixed time | 3 |
| ⋮ | ⋮ |
| Continuous lighting of 50 hours or above | 4 |
| Sudden OFF of power supply | 1 |

PROJECTION TYPE IMAGE DISPLAY SYSTEM AND COLOR CORRECTION METHOD THEREOF

CROSS-REFERENCE TO RELATED APPLICATIONS

This application is based upon and claims the benefit of priority from the prior Japanese Patent Application No. 2001-371786, filed on Dec. 5, 2001, the entire contents of which are incorporated herein by reference.

BACKGROUND OF THE INVENTION

1. Field of the Invention

The present invention relates to a projection type image display system and a color correction method thereof, and more particularly to a technique to correct a change or the like in color or luminance (corresponding to light intensity).

2. Description of the Related Art

There has been proposed a multi-projection display system which combines partial images from a plurality of projectors (image displaying means) and displays them as one image. In this multi-projection display system, it is important to correct a difference in color or brightness generated due to a difference in characteristic between respective displays (projectors).

For example, Jpn. Pat. Appln. KOKAI Publication No. 2001-54131 discloses a method which measures characteristic data of each display by using measuring means such as a spectrophotometer, an imaging device, a calorimeter or an illumination photometer and corrects a difference in color reproduction property between the respective displays based on a measurement result. Consequently, images projected on a screen by a plurality of the displays can be recognized as one image from which discontinuity can not be felt.

However, in the above-described correction method, when an age-based change has occurred in each display and correction is again necessary, a user or a service personnel must perform measurement by the above-described measuring means, which is very troublesome.

Further, in order to correct a white balance or a convergence error, light detecting means may be provided inside or outside the displays in some cases. For example, Jpn. Pat. Appln. KOKOKU Publication No. 7-121129 proposes to arrange a mirror (or a half mirror) having the dedicated finishing applied to a surface thereof in a light path and arrange the light detecting means on a back side of the mirror. Furthermore, Jpn. Pat. Appln. KOKAI Publication No. 7-284120 proposes to arrange light detecting means in an over scan portion of the display. As a result, the projected light from each display can be measured by the light detecting means, and the white balance or the convergence error can be corrected.

However, when the mirror (or the half mirror) having the dedicated finishing applied to the surface thereof is used, a partial or overall reduction in quantity of light occurs on the screen due to application of the finishing on the surface of the mirror, thereby deteriorating the image quality.

Moreover, for example, Jpn. Pat. Appln. KOKAI Publication No. 8-292495 proposes a display system which warns a replacement timing of a lamp by detecting a change in brightness of a light source. As a result, it is possible to be aware of the necessity of replacement of the lamp before the lamp is burned out.

In the above proposal, however, only notification of information concerning the lamp replacement is assumed. In the multi-projection display system, therefore, it is not possible to obtain information that replacement of the lamp is unnecessary but simplified color correction between the displays is required, or information that correction using the measuring means is required instead of the simplified correction.

In this manner, the prior art has a problem that correction takes a lot of trouble and is complicated, a problem that the image quality is deteriorated due to the correcting means, or a problem that the necessity of the correction processing can not be notified.

It is an object of the present invention to provide a projection type image display system or the like which can reduce the complication of correction, suppress the deterioration in image quality due to the correcting means, or readily recognize the necessity of the correction processing.

BRIEF SUMMARY OF THE INVENTION

According to a first aspect of the present invention, there is provided a color correction method of a projection type image display system which projects an image from color image displaying means onto a screen, the method comprising: a step of measuring an initial XYZ-tristimulus value of an image projected onto the screen at the time of initial adjustment; a step of measuring an initial luminance value of the image projected onto the screen at the time of initial adjustment; a step of obtaining a correlation between the initial XYZ-tristimulus value and the initial luminance value; a step of measuring a maximum luminance value of each of primary colors of an image projected onto the screen upon lapse of a predetermined time from the initial adjustment; a step of estimating an XYZ-tristimulus value of the image on the screen upon lapse of the predetermined time based on the maximum luminance value and the correlation; and a step of calculating a color correction coefficient based on the estimated XYZ-tristimulus value.

According to a second aspect of the present invention, there is provided a projection type image display system comprising: color image displaying means for displaying an image to be projected onto a screen; means for storing a correlation between an initial XYZ-tristimulus value of an image projected onto the screen at the time of initial adjustment and an initial luminance value of the image projected onto the screen at the time of initial adjustment; luminance measuring means for measuring a maximum luminance value of each of primary colors of an image projected onto the screen upon lapse of a predetermined time from the initial adjustment; means for estimating an XYZ-tristimulus value of the image on the screen upon lapse of the predetermined time based on the maximum luminance value and the correlation; and means for calculating a color correction coefficient based on the estimated XYZ-tristimulus value.

According to a third aspect of the present invention, there is provided a projection type image display system comprising: image displaying means for displaying an image; a projection optical system which projects the image displayed by the image displaying means; and a screen which displays the image projected by the projection optical system, wherein the projection optical system includes: a reflecting mirror which reflects light from the image displaying means toward the screen and is configured in such a manner that a reflecting surface has a uniform reflectance; and luminance measuring means which is provided on a surface opposite to the reflecting surface and measures a luminance value of light transmitted through the reflecting mirror from the image displaying means.

According to a fourth aspect of the present invention, there is provided a projection type image display system which displays a single color image by using a plurality of partial color images, comprising: a plurality of partial color image displaying means each of which receives color image data and displays a partial color image; a plurality of luminance measuring means each of which measures a luminance value of an image displayed by a corresponding one of the partial color image displaying means; comparing means for comparing a plurality of the luminance values measured by the plurality of the luminance measuring means; and warning means for performing warning based on a comparison result obtained by the comparing means.

According to a fifth aspect of the present invention, there is provided a projection type image display system which displays a single color image by using a plurality of partial color images, comprising: a plurality of partial color image displaying means each of which receives color image data and displays a partial color image; a plurality of luminance measuring means each of which measures a luminance value of an image displayed by a corresponding one of the partial color image displaying means; evaluating means for numerically evaluating an age-based change factor of an image based on a measurement result obtained by the luminance measuring means; and warning means for performing warning based on an evaluation result obtained by the evaluating means.

According to a sixth aspect of the present invention, there is provided a projection type image display system comprising: image displaying means for displaying an image; a projection optical system which projects the image displayed by the image displaying means; and a screen which displays the image projected by the projection optical system, wherein the projection optical system includes: a reflecting mirror which reflects light from the image displaying means toward the screen; luminance measuring means for measuring a luminance value of the light reflected by the reflecting mirror; and reflecting mirror driving means which changes an angle of the reflecting mirror in such a manner that the luminance measuring means is not irradiated with the light reflected by the reflecting mirror when projecting a regular image and that the luminance measuring means is irradiated with the light reflected by the reflecting mirror when measuring a luminance value.

According to a seventh aspect of the present invention, there is provided a projection type image display system comprising: image displaying means for displaying an image; a projection optical system which projects the image displayed by the image displaying means and has luminance measuring means for measuring a luminance value of light from the image displaying means; a screen which displays the image projected by the projection optical system; moving means for moving the luminance measuring means in such a manner that the luminance measuring means is not irradiated with light from the image displaying means when projecting a regular image and that the luminance measuring means is positioned between the screen and the image displaying means when measuring a luminance value; and shielding means for preventing external light which is transmitted through the screen and enters the image displaying means side.

According to an eighth aspect of the present invention, there is provided a projection type image display system comprising: image displaying means for displaying an image; a projection optical system which projects the image displayed by the image displaying means and has luminance measuring means for measuring a luminance value of light from the image displaying means; a screen which displays the image projected by the projection optical system; and moving means for moving the luminance measuring means on a surface of the screen opposite to a surface on the image displaying means side of the screen in such a manner that the luminance measuring means is not irradiated with light from the image displaying means when projecting a regular image and that the luminance measuring means is irradiated with light from the image displaying means when measuring a luminance value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments according to the present invention will now be described hereinafter with reference to the accompanying drawings.

(First Embodiment)

Figure 1:
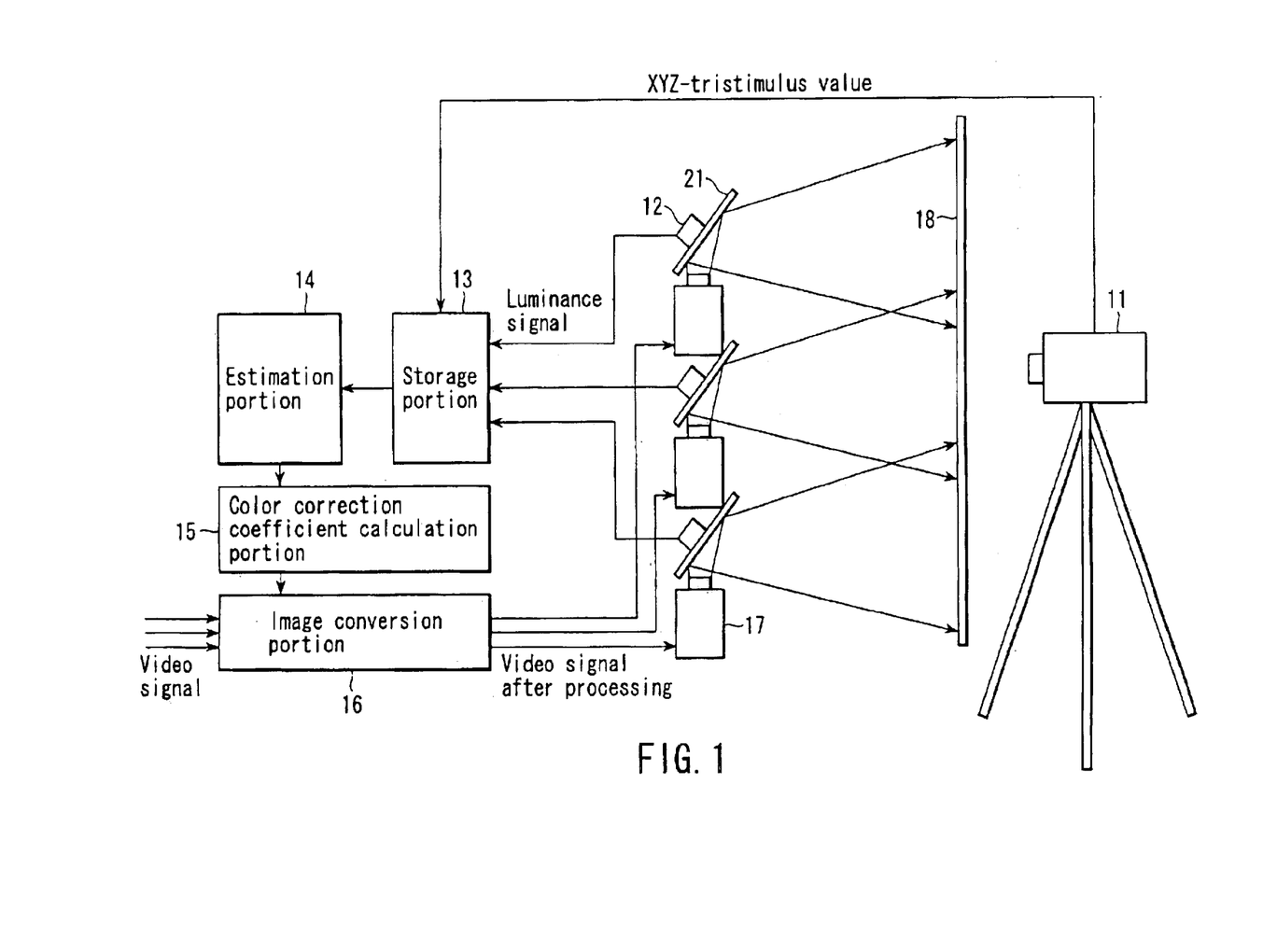
FIG. 1 is a view typically showing a structural example of a projection type image display system according to a first embodiment of the present invention.

FIG. 1 shows a structural example of a rear projection type color image display system according to a first embodiment of the present invention. It is to be noted that the present invention is not particularly restricted to the rear projection type color image system but description will be given as to an example of the rear projection type in this embodiment.

This projection type color image display system comprises a tristimulus value measurement portion 11, a luminance measurement portion 12, a storage portion 13, an estimation portion 14, a color correction coefficient calculation portion 15, an image conversion portion 16, a color image display portion 17, a screen 18, and a reflecting mirror 21.

The tristimulus value measurement portion 11 has a measuring instrument capable of measuring an XYZ-tristimulus value, e.g., a spectrophotometer. The XYZ-tristimulus value of an image projected onto the screen 18 from the color image display portion 17 such as a projector is measured in each primary color by using tristimulus value measurement portion 11. This measurement is carried out at the time of initial adjustment performed in, e.g., a factory.

The luminance measurement portion 12 is constituted by a light receiving element capable of measuring a luminance, e.g., a photodiode. This luminance measurement portion 12 is used to measure a luminance value of the image projected onto the screen 18 from the color image display portion 17 for each primary color. This measurement is also carried out at the time of initial adjustment conducted in, e.g., a factory.

In measurement of the tristimulus measurement portion 11 and the luminance measurement portion 12 in the initial adjustment, the same area of the same image is measured at several stages of the luminance level simultaneously as far as possible for each primary color. Then, the correlation between the XYZ-tristimulus value and the luminance value is obtained for each primary color. The obtained correlation is stored in the storage portion 13. The same area is measured by the tristimulus measurement portion 11 and the luminance measurement portion 12 in order to prevent the correlation from being adversely affected by nonuniformities in luminance and in γ of the color image display portion 17.

Figure 2:
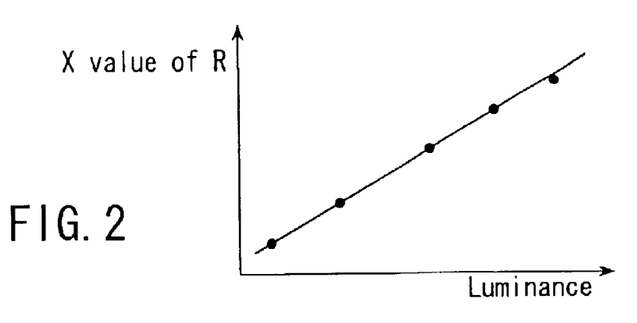
FIG. 2 is a view showing an example of the correlation between an X value of a primary color R and a luminance value according to the first embodiment of the present invention.

FIG. 2 shows an example of the correlation between an X value of a primary color R and a luminance value. For example, as shown in FIG. 2, measurement is carried out with at the five stages of luminance, and values between measurement points are obtained by linear interpolation. At this moment, an excellent S/N ratio can be readily obtained by selecting a largest value in three stimulus values X, Y and Z. According to the examination by the present inventors, when X is chosen in case of the primary color R (red); Y, the primary color G (green); Z, the primary color B (blue); or when Y is chosen in case of the primary colors R and G; Z, the primary color B, the correlation becomes substantially linear, and estimation of the XYZ-tristimulus value can be facilitated.

After elapse of a predetermined time from initial adjustment, a maximum luminance value of the image projected onto the screen 18 from the color image display portion 17 is measured by the luminance measurement portion 12 for each primary color. Further, the XYZ-tristimulus value of each primary color after elapse of the predetermined time is estimated by the estimation portion 14 based on the luminance value after elapse of the predetermined time and the correction between the XYZ-tristimulus value and the luminance value stored in the storage portion 13.

Subsequently, a color correction coefficient is calculated from the estimated XYZ value and the XYZ value measured at the time of initial adjustment by the later-described method using the color correction coefficient calculation portion 15.

The calculated color correction coefficient for each image display portion is supplied to the image conversion portion 16. In the image conversion portion 16, image conversion processing for each video signal is performed by using each color correction coefficient corresponding to each image display portion 17. A converted video signal is supplied to each image display portion 17. An image based on the corrected video signal is projected onto the screen 18 from each image display portion 17. As a result, one image from which the color difference between the images due to an age-based change has been eliminated is displayed on the screen.

As described above, in this embodiment, measurement is performed by using the tristimulus value measurement portion only in the initial adjustment, and thereafter adjustment (correction of an age-based change) is carried out based on the measurement result of the luminance measurement portion in the system. Therefore, a user does not have to conduct the complicated measurement using a spectrophotometer or the like and can greatly reduce the trouble of correction processing.

Description will now be given as to an example of a basic color reproduction method in a multi-projection display system.

Signal values of respective primary colors inputted to the image conversion portion 16 from a video signal source are determined as Rin, Gin and Bin (input signal values), and signal values of the respective primary colors outputted from the image conversion portion 16 are determined as Rout, Gout and Bout (output signal values). The input signal values do not depend on the characteristic of each color image display portion 17. The image conversion portion 16 converts the input signal values Rin, Gin and Bin into display signal values Rout, Gout and Bout suitable for display in accordance with the color reproduction property of each color image display portion 17. Assuming that a is an element of a matrix A used to convert the input signal value Rin, Gin and Bin into the XYZ-tristimulus value, the following relationship can be obtained:

$$\begin{bmatrix} X \\ Y \\ Z \end{bmatrix} = A \begin{bmatrix} R_{in} \\ G_{in} \\ B_{in} \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} R_{in} \\ G_{in} \\ B_{in} \end{bmatrix} \quad (1)$$

Furthermore, the relationship between the XYZ-tristimulus value and the display signals Rout, Gout and Bout is as follows:

$$\begin{bmatrix} R_{out} \\ G_{out} \\ B_{out} \end{bmatrix} = \begin{bmatrix} X_{ri} & X_{gi} & X_{bi} \\ Y_{ri} & Y_{gi} & Y_{bi} \\ Z_{ri} & Z_{gi} & Z_{bi} \end{bmatrix}^{-1} \begin{bmatrix} X \\ Y \\ Z \end{bmatrix} \quad (2)$$

Xr, Yr and Zr are XYZ values at the time of maximum light emission based on the signal value Rout; Xg, Yg and Zg are XYZ values at the time of maximum light emission based on the signal value Gout; and Xb, Yb and Zb are XYZ values at the time of maximum light emission based on the signal value Bout. They represent the color reproduction property of each color image display apparatus. Moreover, "i" is an identification signal inherent to the image display apparatus and denotes, e.g., 1 to 4.

Based on the expression (1) and the expression (2), the output signal values Rout, Gout and Bout can be represented as follows.

$$\begin{bmatrix} R_{out} \\ G_{out} \\ B_{out} \end{bmatrix} = \begin{bmatrix} X_{ri} & X_{gi} & X_{bi} \\ Y_{ri} & Y_{gi} & Y_{bi} \\ Z_{ri} & Z_{gi} & Z_{bi} \end{bmatrix}^{-1} \begin{bmatrix} a_{00} & a_{01} & a_{02} \\ a_{10} & a_{11} & a_{12} \\ a_{20} & a_{21} & a_{22} \end{bmatrix} \begin{bmatrix} R_{in} \\ G_{in} \\ B_{in} \end{bmatrix} \quad (3)$$

The matrix A is determined as a certain value concerning the display system, and the XYZ-tristimulus value at the time of maximum light emission for each color of each display apparatus is measured, thereby calculating the color correction coefficient between the display images. The following matrix determined based on, e.g., the sRGB standard may be used as the matrix A.

$$A = \begin{bmatrix} 0.4124 & 0.3576 & 0.1805 \\ 0.2126 & 0.7152 & 0.0722 \\ 0.01983 & 0.1192 & 0.9505 \end{bmatrix}^{-1} \quad (4)$$

In the present invention, the XYZ-tristimulus value is measured by a colorimeter or the like only in the initial adjustment, thereafter only the luminance value is measured by a luminance sensor or the like, and the XYZ value required for correction is estimated from the obtained luminance value, thereby performing color correction.

When estimating the XYZ-tristimulus value from the luminance value, such a correlation as shown in FIG. 2 is used. In general, if an output value from the sensor and the luminance value of the incident light on the sensor demonstrate the linear relationship, the relationship between maximum value of the XYZ value of each primary color and the luminance value becomes linear, and the relational expression becomes a linear expression.

The expression (2) can be modified like the following expression (5).

$$\begin{bmatrix} R_{out} \\ G_{out} \\ B_{out} \end{bmatrix} = C \cdot D \cdot \begin{bmatrix} X \\ Y \\ Z \end{bmatrix} = \begin{bmatrix} \frac{1}{X_{ri}} & 0 & 0 \\ 0 & \frac{1}{Y_{gi}} & 0 \\ 0 & 0 & \frac{1}{Z_{gi}} \end{bmatrix} \begin{bmatrix} 1 & \frac{x_{gi}}{y_{gi}} & \frac{x_{bi}}{z_{bi}} \\ \frac{y_{ri}}{x_{ri}} & 1 & \frac{y_{bi}}{z_{bi}} \\ \frac{z_{ri}}{x_{ri}} & \frac{z_{gi}}{y_{gi}} & 1 \end{bmatrix}^{-1} \begin{bmatrix} X \\ Y \\ Z \end{bmatrix} \quad (5)$$

Here, x, y and z designate chromaticity values, and the relationship between the chromaticity values and the XYZ-tristimulus value is as follows.

$$x = \frac{X}{X+Y+Z} \quad y = \frac{Y}{X+Y+Z} \quad z = \frac{Z}{X+Y+Z} \quad (6)$$

By assigning the expression (1) to the expression (6), the relationship between the input signal values Rin, Gin and Bin and the output signal values Rout, Gout and Bout can be obtained.

In general, with an age-based change of the projector, a ratio of X, Y and Z of each primary color varies, but the chromaticity coordinates x, y and z do not vary. Therefore, in the two matrices C and D concerning XYZ, measuring D only in the initial adjustment can suffice, and it is good enough to measure only C after an age-based change. Elements other than 0 of C can be obtained by estimating the XYZ values from the luminance value of the luminance sensor. Therefore, color correction based on an age-based change can be performed by obtaining only the luminance value.

It is to be noted that X is selected for R, Y is selected for G, Z is selected for B and normalization is performed by the expression (5) in this example. This is because a given value in three stimulus values is generally larger than any other values in each primary color. Although the S/N ratio is improved when a larger value is selected, Y may be selected for R, Y man be selected for G and Z may be selected for B, for example, if the S/N ratio is not a problem.

Description will now be given as to a method of measuring the luminance without causing a user to be aware of execution of measurement.

For example, there is a method which displays a maximum light emission image of RGB which is not yet to be subjected to correction processing and performs measurement for the image, for each time as a series of processing at the end of system operation. The measurement is carried out at the end of system operation because a display such as a liquid crystal projector has the luminance being unstable for a while after turning on a power supply and hence data measurement with the high reliability is hard to be conducted. In this method, estimation and calculation concerning color correction are effected and the calculated color correction coefficient is transmitted to the image conversion portion after the end of system operation during which display is not carried out. Then, at the start of next system operation, the correction result is reflected.

The uncorrected maximum light emission image of RGB which is displayed at the end of system operation does not have to be entirely uniform, and it is good enough if a desired image is displayed only in a measurement target area. Therefore, for example, an image at the end of system operation may include a logo or the like of a manufacturer, and an image such as a pattern may be displayed as an uncorrected RGB maximum light emission image only in an area required for measurement.

Further, when display of the uncorrected RGB maximum light emission image is unnatural, a corrected monochromatic image of R, G or B may be displayed. However, inverse correction of the correction performed in the image conversion portion is applied to the measured luminance, the luminance value of the maximum light emission image in the case of no correction is calculated, and a calculated value is used in calculation for color correction. Furthermore, when applying the inverse correction to the measured luminance value in this manner, it is possible to adopt a method which necessarily performs measurement when a monochromatic image which can be measured is displayed in a measurement target area during display of a series of regular contents.

By performing measurement with the above-described measurement timing, an image with which a difference in color between displays is not always recognized can be displayed without causing a user to be aware of performance of luminance measurement for color correction.

(Second Embodiment)

A second embodiment according to the present invention will now be described.

Figure 3:
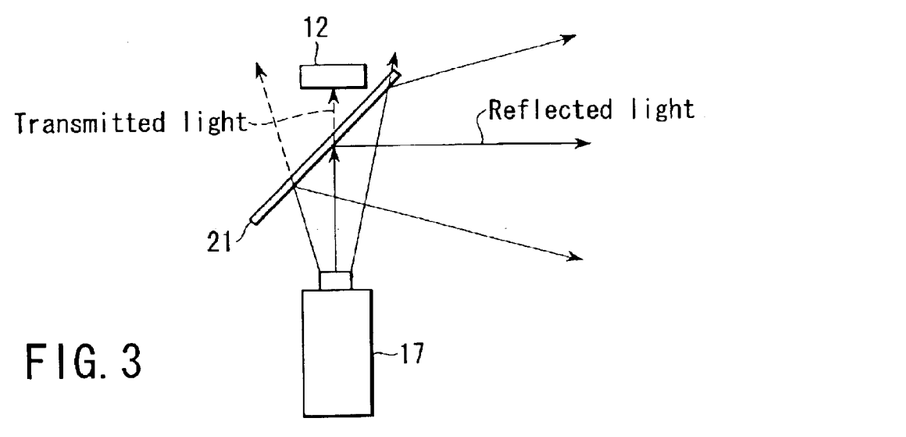
FIG. 3 is a view showing a structural example of a reflecting mirror and others according to a second embodiment of the present invention.

This embodiment mainly concerns the reflecting mirror 21 shown in FIG. 1. FIG. 3 shows a structural example of a projection optical system comprises a luminance measurement portion 12 and the reflecting mirror 21.

In this embodiment, the luminance measurement portion 12 is arranged on the back side of the reflecting mirror 21 used to project the light from the color image display portion 17 onto the screen 18, namely, the side opposite to the image display portion 17 with the reflecting mirror 21 therebetween. The reflecting mirror 21 is obtained by evaporating a metal film on a high-transmittance material such as glass. This reflecting mirror 21 has a high reflectance of not less than 80% and not more than 99%. Therefore, it reflects a large part of light and transmits therethrough a small quantity of light which can not be reflected. This transmitted light enters a light receiving surface of the luminance measurement portion 12. A reflecting surface of the reflecting mirror 21 has a flat surface or a curved surface.

Figure 4A:
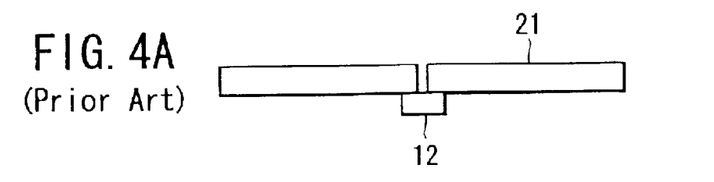
FIGS. 4A and 4B are views showing a comparative example of the second embodiment according to the present invention.
Figure 4B:
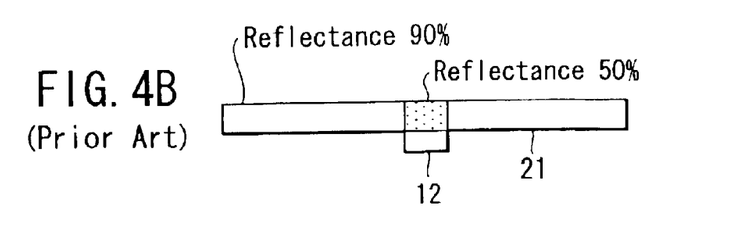

FIGS. 4A and 4B show structures of the reflecting mirror 21 and the luminance measurement portion 12 according to a comparative example of the present invention (corresponding to a prior art). In FIG. 4A, the light can reach the luminance measurement portion 12 from the image display portion by forming a small hole in the reflecting mirror. In FIG. 4B, only a portion corresponding to the luminance measurement portion 12 is finished so as to reduce the reflectance and increase the transmittance, and the reflectance of the reflecting surface is set to approximately 50%. Since any finishing is applied to the mirror in the prior art in this way, the image quality is deteriorated due to reduction in a quantity of light or the like.

Comparing with the above-described comparative example, the reflecting mirror 21 of this embodiment has no special finishing to reduce the reflectance applied thereto, and the entire reflecting surface is uniform and has a high reflectance. Therefore, there is no generated deterioration in image quality of the displayed image due to luminance measurement. In other words, since the light which is unnecessary for image display on the screen is measured, reduction in a quantity of light due to luminance measurement is not generated.

Figure 5:
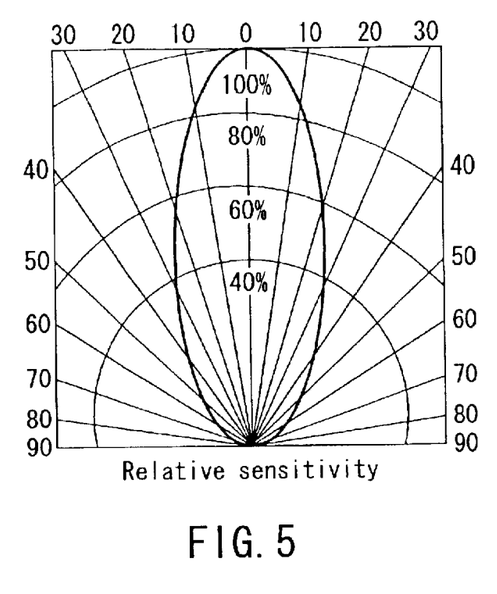
FIG. 5 is a view showing an example of a directivity characteristic of a general photodiode according to the second embodiment of the present invention.

In addition, it is desirable that the light receiving surface of the luminance measurement portion 12 is vertical to the light ray to be irradiated. This is because the luminance measurement portion 12 generally has the directivity and the highest sensitivity for the light which has vertically entered the light receiving surface. FIG. 5 shows an example of the directivity of a general photodiode.

Figure 6:
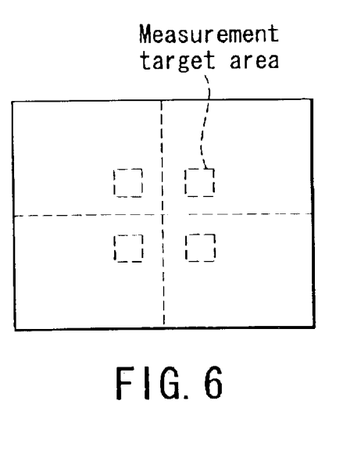
FIG. 6 is a view showing an example of a measurement target area where measurement is carried out by a luminance measurement portion according to the second embodiment of the present invention.

Additionally, for example, as shown in FIG. 6, when one image is displayed by using four image display apparatuses, it is desirable that a measurement target area where measurement is performed by the luminance measurement portion 12 is neighboring areas of the respective images. This is because color shift in the vicinity of adjacent areas of the respective images is most prominent and hence color correction in the vicinity of such areas is important.

Figure 7:
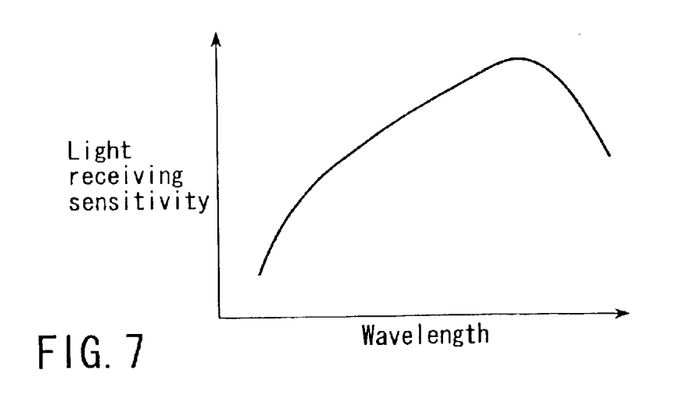
FIG. 7 is a view showing an example of a spectral response characteristic of a photodiode according to the second embodiment of the present invention.

Further, in the example described above, each luminance measurement portion 12 is provided to each color image display portion 17. FIG. 7 shows an example of the spectral response characteristic of the photodiode. As shown in FIG. 7, the spectral response (light receiving sensitivity) varies depending on wavelengths. Therefore, it is desirable to change over the amplification factor of the amplifier for each color to the measured and measure the luminance value in such a manner that a measured value of each primary color falls within an appropriate range.

(Third Embodiment)

Figure 8:
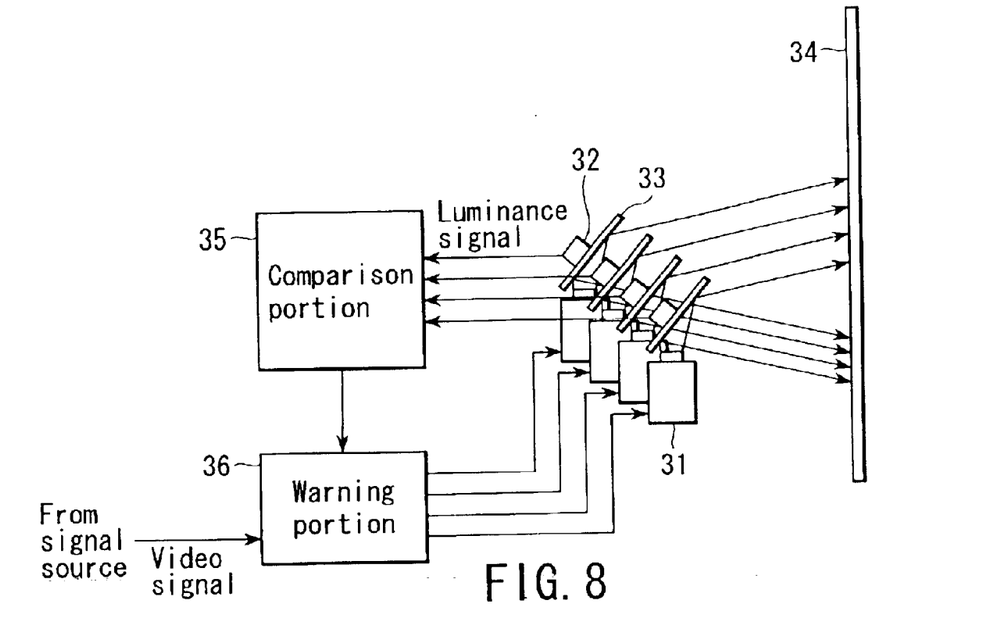
FIG. 8 is a view typically showing a structural example of a projection type image display system according to a third embodiment of the present invention.

FIG. 8 shows a structural example of a multi-projection display system according to a third embodiment of the present invention.

This system comprises an image display portion 31, a luminance measurement portion 32, a reflecting mirror 33, a screen 34, a measured value comparison portion 35, and a warning portion 36. It is to be noted that the structure shown in FIG. 8 is different from the structure shown in FIG. 1 in the number and arrangement of the image display apparatuses 31 but the present invention does not depend on the number and arrangement of the projectors.

A predetermined video signal is inputted in each image display portion 31, and each luminance value of the projection light from each image display portion 31 to the screen 34 is measured by each luminance measurement portion 32 provided on the back side of the reflecting mirror 33. Each measured luminance value is supplied to the comparison portion 35, and the respective luminance values are compared with each other in the comparison portion 35. Then, if the lowest luminance value is, e.g., not more than 50% of the highest luminance value, identification information (inherent number or the like) of the color image display portion 31 having the lowest luminance is supplied to the warning portion 36. Each video signal corresponding to each image display portion 31 is inputted to the warning portion 36. Among these video signals, a warning signal is superimposed on the video signal corresponding to the image display portion 31 having a lower luminance. Furthermore, the video signal having the warning signal superimposed thereon is supplied to the image display portion 31. Since the warning is displayed on the image to be displayed in this manner, a user can recognize whether color correction processing is necessary by watching the image on the screen.

Figure 9:
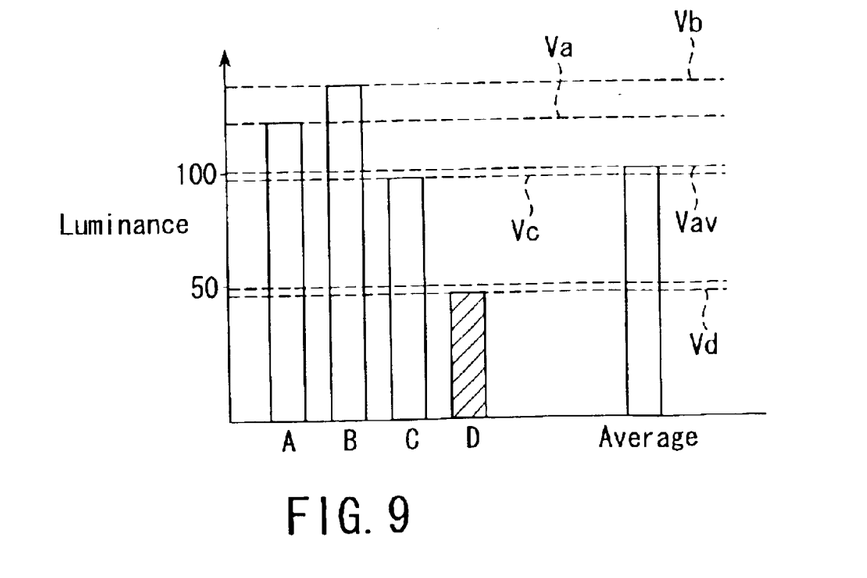
FIG. 9 is a view showing an example of a luminance value when generating a warning signal according to a third embodiment of the present invention.

Incidentally, when whether the color correction method described in the first embodiment is effective is judged in the comparison portion 35 and the deterioration is generated to a degree that the above color correction method is not effective, warning information may be displayed on the screen 34. Moreover, when an average value of the luminance measured values of the respective image display portions 31 is obtained by the comparison portion 35 and the lowest luminance value is not more than 50% of the average value, the warning portion 36 may generate the warning information. FIG. 9 shows this. It is assumed that Va, Vb, Vc and Vd are respectively the luminance values of the image display apparatuses A, B, C and D and Vav is an average value of the luminance values of the four image display apparatuses. The example in the figure shows that Vd is minimum and smaller than Vav. In addition, a series of display images may include an image for luminance measurement and luminance measurement may be performed when that image is displayed. Additionally, a warning may be performed by means of voice or the like.

In this manner, since a predetermined warning is performed based on a comparison result of the measured luminance values in this embodiment, a user can readily and assuredly recognize the necessity of the correction processing.

(Fourth Embodiment)

Figure 10:
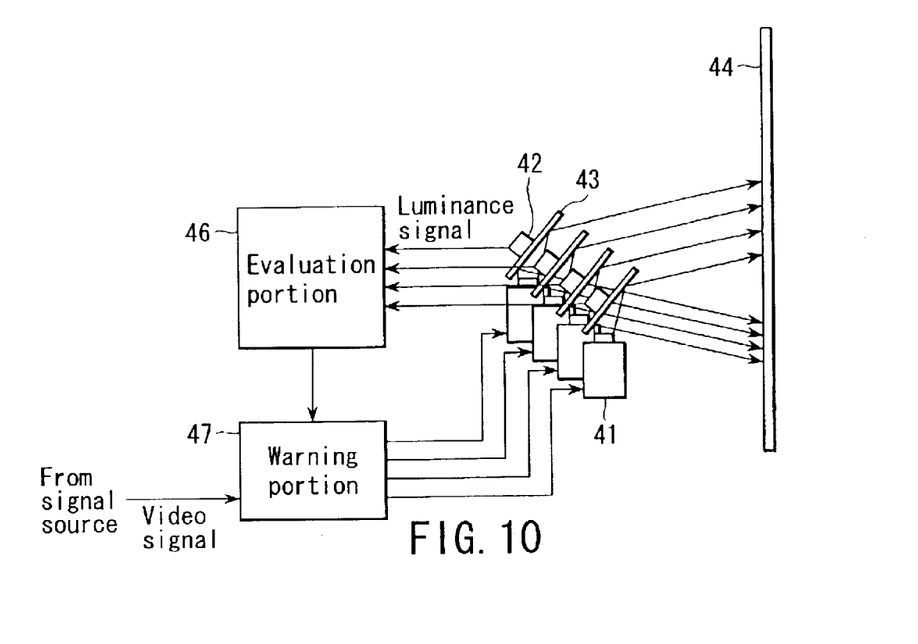
FIG. 10 is a view typically showing a structural example of a projection type image display system according to a fourth embodiment of the present invention.

FIG. 10 shows a structural example of a multi-projection display system according to a fourth embodiment of the present invention.

This system comprises an image display portion 41, a luminance measurement portion 42, a reflecting mirror 43, a screen 44, an evaluation portion 46, and a warning portion 47.

Each luminance value of the projection light from each image display portion 41 to the screen 44 is measured by each luminance measurement portion 42 provided on the back side of the reflecting mirror 43. Each measured luminance value is inputted to the evaluation portion 46. An image deterioration factor which can be presumed from an age-based fluctuation of the luminance value is stored in the evaluation portion 46 as a point (numeric value) for each image display portion 41. In the evaluation portion 46, the point corresponding to the image deterioration factor estimated based on a fluctuation in each measured luminance value is integrated. Then, when the integrated point of a certain image display portion 41 has reached a fixed value, identification information (inherent number or the like) of that image display portion 41 is supplied to the warning portion 47. In the warning portion 47, warning information is supplied to a user by the same method as that in the third embodiment.

Figure 11:
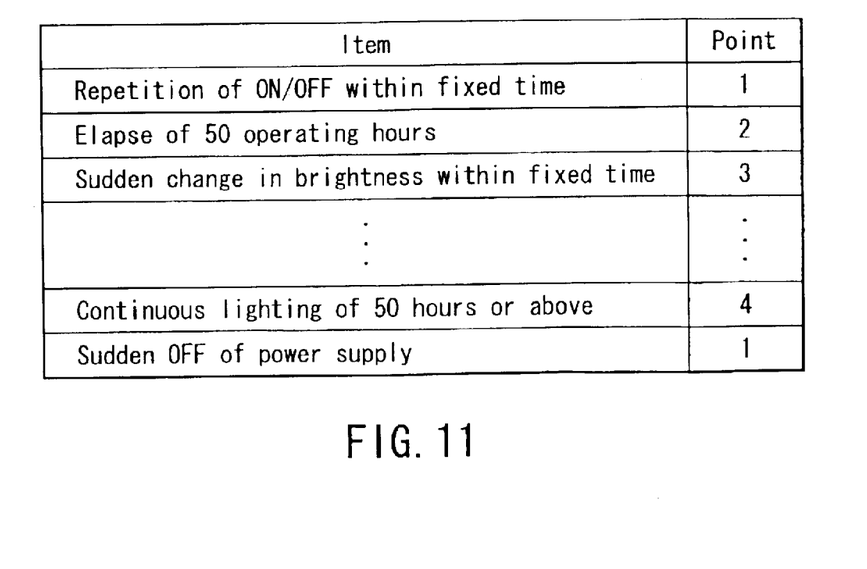
FIG. 11 is a view for illustrating the fourth embodiment of the present invention.

It is to be noted that, as examples of the image quality deterioration factor which can be estimated based on a fluctuation in the measured luminance, there are "repetition of ON/OFF within a fixed time", "sudden OFF of the power supply", "rapid reduction in luminance within a fixed time", "continuous lighting for 50 hours or more" and others. As shown in FIG. 11, points are predetermined in accordance with degrees of the influence given to the image deterioration and stored in the evaluation portion 46. Then, in the evaluation portion 46, the points corresponding to the factors estimated based on measurement results of the luminance measurement portion 42 are integrated for each image display portion 41.

As described above, in this manner, since an age-based change factor of an image is numerically evaluated based on a measurement result in the luminance measurement portion and the warning is carried out based on that evaluation result, a user can readily and assuredly recognize the necessity of the correction processing.

(Fifth Embodiment)

Figure 12:
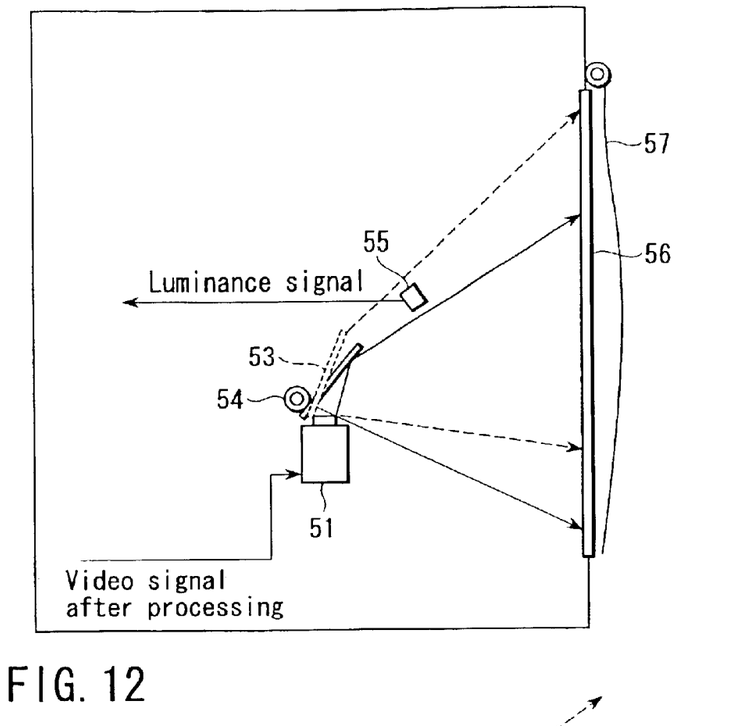
FIG. 12 is a view typically showing a structural example of a projection type image display system according to a fifth embodiment of the present invention.

FIG. 12 shows a structural example of a projection type color image display system according to a fifth embodiment of the present invention.

This system comprises: an image display portion 51; a projection optical system constituted by a reflecting mirror 53, a reflecting mirror drive portion 54 and a luminance measurement portion 55; a screen 56; and a shielding portion 57.

Figure 13:
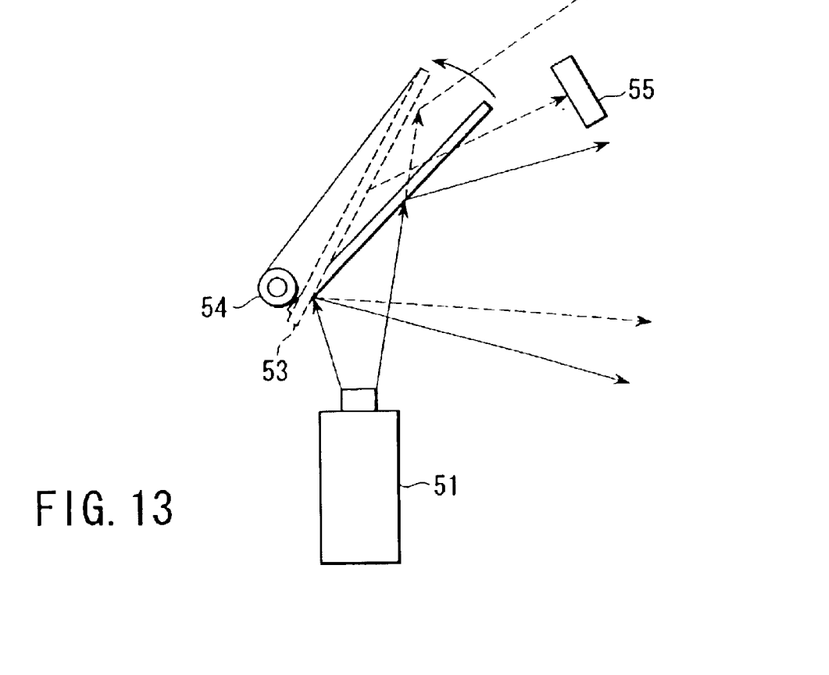
FIG. 13 is a view showing a structural example of a reflecting mirror and others according to the fifth embodiment of the present invention.

An image is displayed by leading the projection light from the image display portion 51 to the screen 56 by the reflecting mirror 53. The luminance measurement portion 55 is not located in a light path of the image light from the image display portion 51 to the screen 56 at the time of regular image display, but arranged at a position slightly deviating from the light path with a light receiving surface directed toward the image display portion 51. At the time of luminance measurement, the luminance measurement portion 55 is irradiated with the image light by changing an inclination of the reflecting mirror 53 by using the mirror drive portion 54. Further, at the time of luminance measurement, the external light which is transmitted through the screen 56 is prevented by the shielding portion 57, thereby enabling measurement. After end of the measurement, the reflecting mirror 53 is again returned to an original angle by the reflecting mirror drive portion 54. FIG. 13 shows the positional relationship between the reflecting mirror 53, the luminance measurement portion 55, and the light ray from the image display portion 51 in these operations.

As described above, in this embodiment, when a regular image is projected onto the screen, display is enabled without reducing the luminance of the projected image. When measuring the luminance, the luminance can be assuredly measured by changing the inclination of the reflecting mirror.

Figure 14:
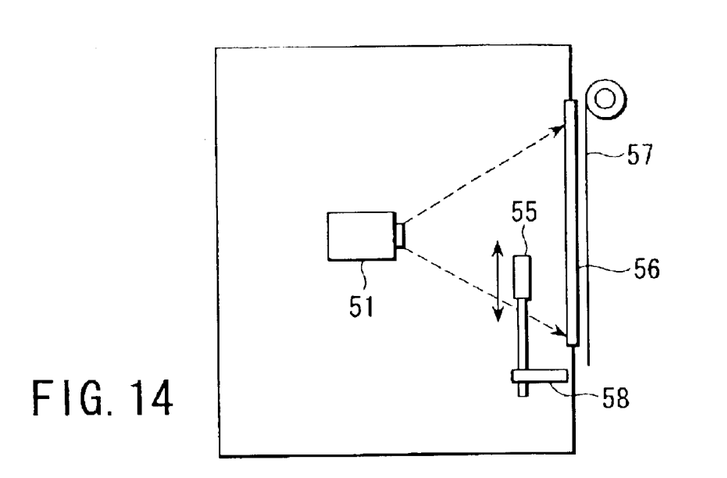
FIG. 14 is a view typically showing another structural example of the projection type image display system according to the fifth embodiment of the present invention.

FIG. 14 is a view showing another example of this embodiment. This example moves the luminance measurement portion 55 by the light sensor movement portion 58.

In this example, the light receiving portion of the luminance measurement portion 55 constantly faces toward the image display portion 51. At the time of regular image display, the luminance measurement portion 55 is not located in the light path of the image light from the image display portion 51 to the screen 56. At the time of luminance measurement, measurement is enabled by moving the luminance measurement portion 55 into the light path of the image light by using the light sensor movement portion 58. After end of measurement, the luminance measurement portion 55 is again placed at a position where it is not irradiated with the image light.

Figure 15:
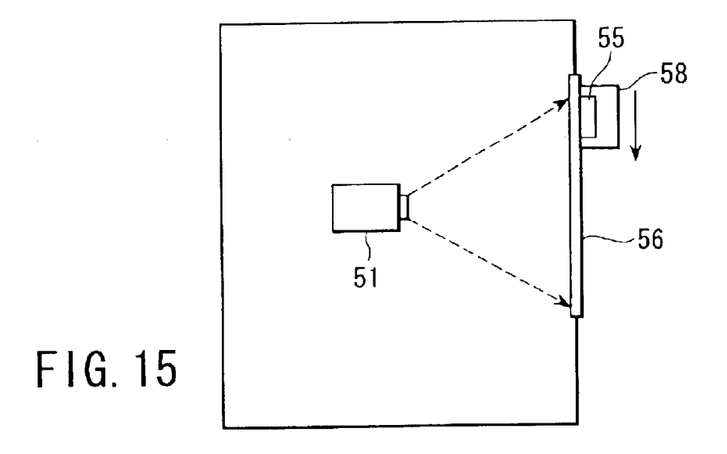
FIG. 15 is a view typically showing still another structural example of the projection type image display system according to the fifth embodiment of the present invention.

FIG. 15 is a view showing still another example of this embodiment. This example also moves the luminance measurement portion 55 by the light sensor movement portion 58.

In this example, the luminance measurement portion 55 is arranged outside the screen 56 with the light receiving surface facing toward the image display portion 51. Then, in measurement, the luminance measurement portion 55 is moved on the screen 56 by the light sensor movement portion 58, and the luminance of the image light is measured.

As described above, in the examples shown in FIGS. 14 and 15, the same effects and advantages as those in the example depicted in FIG. 12 can be obtained by moving the luminance movement portion by the light sensor movement portion.

(Sixth Embodiment)

A sixth embodiment according to the present invention will now be described with reference to FIGS. 16 and 17.

Figure 16:
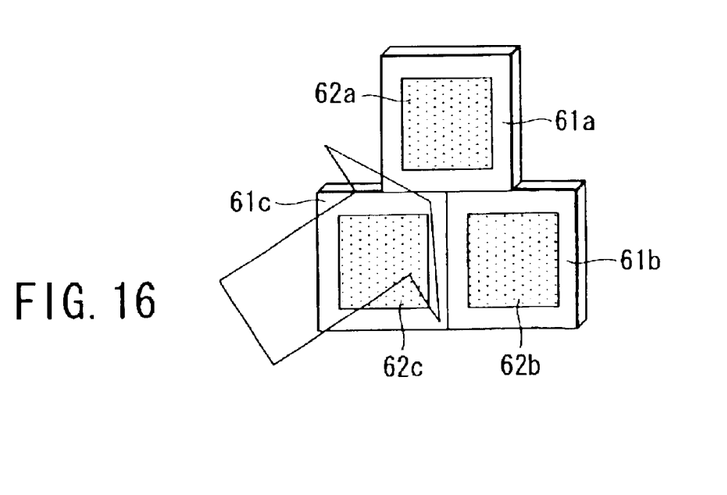
FIG. 16 is a view showing a structural example of a luminance measurement portion according to a sixth embodiment of the present invention.

FIG. 16 shows one of the luminance measurement portions shown in FIG. 1 in detail, for example. As shown in FIG. 16, each sensor forming the luminance measurement portion is constituted by three sensor cells 61a, 61b and 61c and three optical filters 62a, 62b and 62c. The three sensor cells 61a, 61b and 61c are fitly arranged so as to be small sufficiently with respect to a projection angle of the image display portion. Therefore, the luminance at substantially the same position in the projection image can be measured by the three sensor cells 61*a*, 61*b* and 61*c*. The optical filters 62*a*, 62*b* and 62*c* are arranged on the incident surface side of the sensor cells 61*a*, 61*b* and 61*c*, and each cell receives light which has been transmitted through each corresponding filter.

Figure 17:
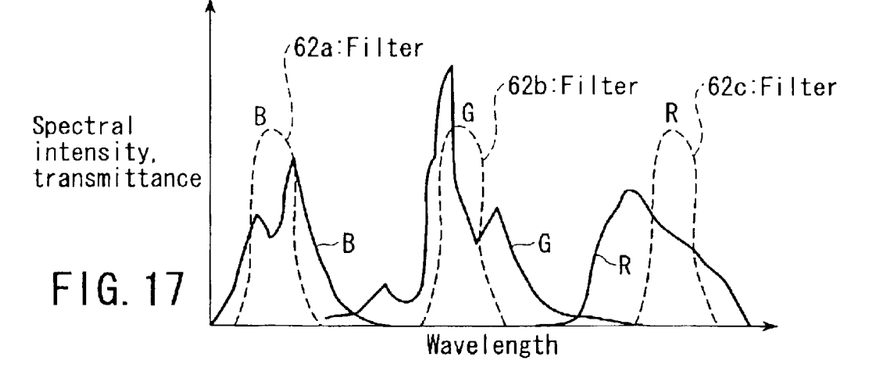
FIG. 17 is a view showing a spectral transmission characteristic of a filter according to the sixth embodiment of the present invention.

FIG. 17 is a view showing spectral transmittance characteristics of the respective filters 62*a*, 62*b* and 62*c* (dotted line) and spectrums of the respective primary colors of the image display apparatus (solid line). As shown in the figure, the filter 62*a* transmits only the light of the primary color B therethrough but not the light of other primary colors G and R. The filter 62*b* transmits the light of the primary color G therethrough but not the light of the primary colors B and R. The filter 62*c* transmits the light of the primary color R therethrough but not the light of the primary colors B and G. By setting the filter characteristics in this way, the sensor cell 61*a* can constantly measure only the luminance of the primary color B; the sensor cell 61*b*, only the luminance of the primary color G; and the sensor cell 61*c*, only the luminance of the primary color R. That is, the respective sensor cells 61*a*, 61*b* and 61*c* can measure the luminance of the corresponding primary colors irrespective of light emission of other primary colors.

In the prior art sensor, when measuring the luminance of the maximum light emission of the primary color, the measurement images of the respective primary colors (R, G and B) must be sequentially displayed on the image display apparatus, and the sensor outputs must be sequentially recorded in synchronization therewith. In this embodiment, since the sensor cell outputs when causing maximum light emission of R, G and B at the same time can be recorded by using the above-described structure, measurement is instantaneously finished. Simultaneously causing maximum light emission of R, G and B corresponds to displaying the white color. Therefore, there is no feeling of strangeness when switched from the regular display to the measurement display. Thus, displaying the white color in a very short time, e.g., an interval of display of contents for appreciation enables measurement without giving a feeling of strangeness to an appreciator.

Figure 18:
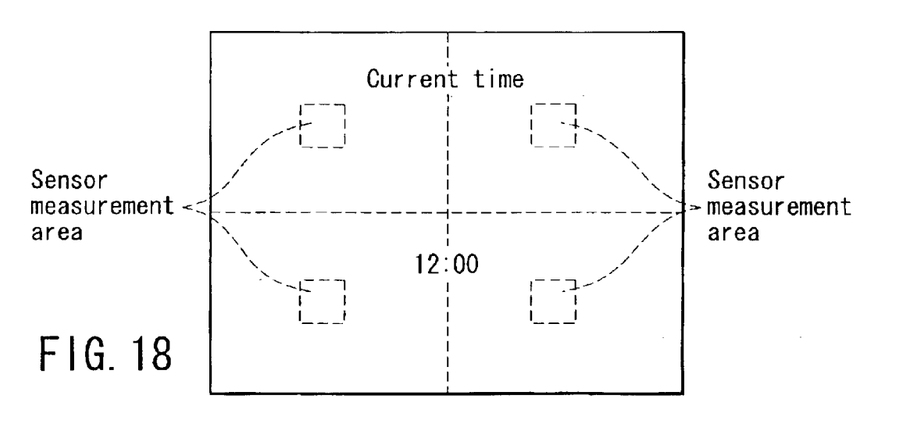
FIG. 18 is a view showing an example of an image for measurement according to the sixth embodiment of the present invention.

Moreover, at the time of measurement, displaying the white color only at a part where the light enters the sensor can suffice, and an image at a part where the light does not enter the sensor may have an arbitrary color. Therefore, by using such an image as shown in FIG. 18 as the measurement image, measurement can be performed without giving a feeling of strangeness. FIG. 18 shows a measurement image when displaying one image by using four image display apparatuses. A character part is displayed in black, and the background is displayed in white. An actual time can be used for the time display. A part surrounded by a dotted line corresponds to the part where the light enters the sensor. This dotted line does not exist in an actual image. By performing, e.g., measurement per hour by using such a measurement image, an appreciator only recognizes the time display. Therefore, measurement can be performed without giving a feeling of strangeness to the appreciator at all.

(Seventh Embodiment)

A seventh embodiment according to the present invention will now be described with reference to FIG. 19.

Figure 19:
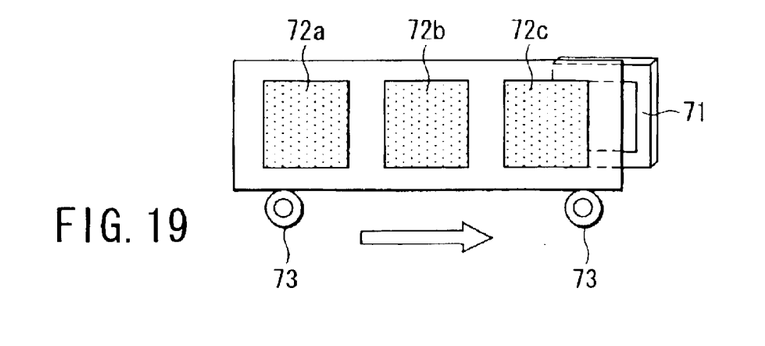
FIG. 19 is a view showing a structural example of a luminance measurement portion according to a seventh embodiment of the present invention.

FIG. 19 shows one of the luminance measurement portion such as illustrated in FIG. 1 in detail. As shown in FIG. 19, each sensor forming the luminance measurement portion is constituted by one sensor cell 71, three optical filters 72*a*, 72*b* and 72*c*, and a filter drive portion 73 which switches the optical filters 72*a*, 72*b* and 72*c*. The filters 72*a*, 72*b* and 72*c* are moved in the horizontal direction by supplying a control signal to the filter drive portion 73 from a non-illustrated filter control portion, thereby changing over the filters 72*a*, 72*b* and 72*c*.

The relationship between the spectral transmittance characteristics of the respective filters 72*a*, 72*b* and 72*c* and the spectrums of the respective primary colors of the image display apparatus is the same as that illustrated in FIG. 17. The filter characteristic is set as shown in FIG. 17, and the filters 72*a*, 72*b* and 72*c* are changed over by the filter drive portion 73. As a result, the sensor cell 71 can measure only the luminance of the primary color B when the filter 72*a* is applied, only the luminance of the primary color G when the filter 72*b* is applied, and only the luminance of the primary color R when the filter 72*c* is applied. That is, the luminance of each primary color can be measured by changing over the filters irrespective of light emission of other primary colors.

In this embodiment, R, G and B are simultaneously caused to perform maximum light emission, the filters are sequentially switched from the filter 72*a* to the filter 72*c* in the light emission period, and the sensor cell outputs are sequentially recorded. Simultaneously causing maximum light emission of R, G and B corresponds to displaying the white color. Therefore, there is no feeling of strangeness when changed over from the regular display to the measurement display. Thus, measurement can be performed without giving a feeling of strangeness to an appreciator by displaying the white color in a very short time, e.g., an interval of displaying contents for appreciation. In addition, in this embodiment, since one sensor cell is used, measurement positions of R, G and B are the same. Therefore, the accuracy of each measurement value of R, G and B can be improved.

It is to be noted that, like the sixth embodiment, measurement can be effected without giving a feeling of strangeness to an appreciator by using such an image as shown in FIG. 18 as the measurement image.

(Eighth Embodiment)

An eighth embodiment according to the present invention will now be described with reference to FIG. 20.

In the apparatus which displays one image by using a plurality of color image display portions 17 illustrated in FIG. 1, although the matrix conversion is used in color matching between images of the respective color image display portions 17 in the first embodiment, color matching between images is performed without using the matrix conversion in this embodiment.

Figure 20:
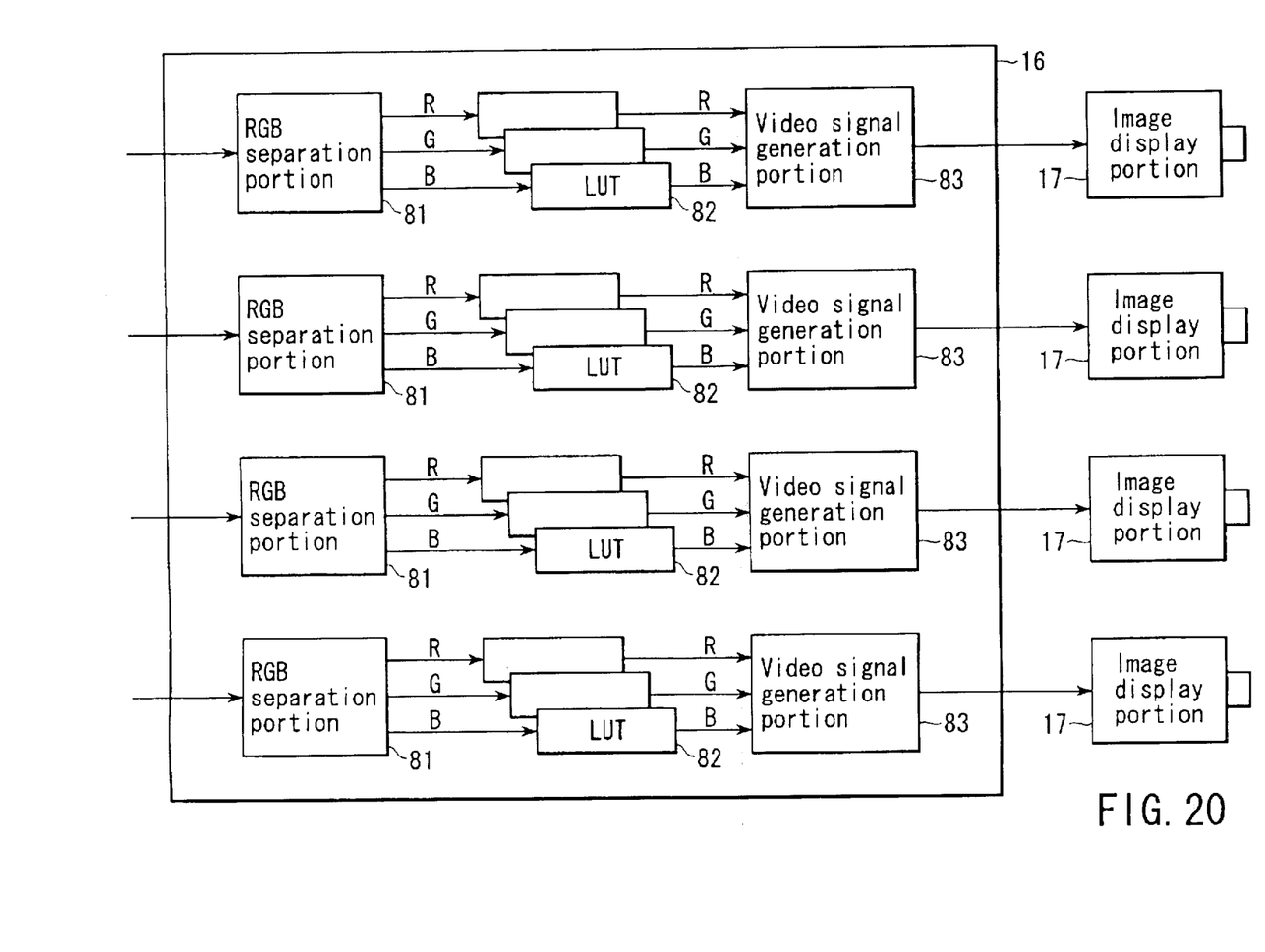
FIG. 20 is a view showing a structural example of an image conversion portion and others according to an eighth embodiment of the present invention.

FIG. 20 shows structures of the image conversion portion 16 shown in FIG. 1 and others. The image conversion portion 16 comprises a plurality of RGB separation portions 81 each of which separates the input image signal into R, G and B, a plurality of LUTs (lookup tables) 82 corresponding to respective signals of separated R, G and B, and a plurality of video signal generation portions 83 each of which generates a video signal from an output of each LUT 82.

Each LUT 82 is provided for each primary color with respect to each image display portion 17, and the relationship between an input signal and an output signal to the image display portion 17 is stored in the LUT 82. In the LUT 82 is set such a value as that a fixed luminance can be obtained with respect to a predetermined input value for each primary color based on a result of measuring a luminance on the screen of the image display portion 17 for each gray level of each primary color (RGB) when using no LUT 82 (LUT 82 has an output and an input equal to each other).

When the chromaticity values are equal between images of a plurality of image display portions 17 for each primary color, such a method can be used. In general, however, it is often the case that chromaticity values differ between images. In such a case, a color difference between images when outputting white is conspicuous. Thus, when calculating a value to be stored in the LUT 82, correction must be performed so as to match not only the luminance value for each primary color but also the chromaticity value when outputting white. Description will now be given as to a method of performing such correction hereinafter.

Based on the method explained in connection with the first embodiment, the XYZ-tristimulus value in maximum light emission for each color in each image display portion 17 is estimated. It is assumed that the estimated XYZ-tristimulus value of R is $X'_R(j)$, $Y'_R(j)$, $Z'_R(j)$, and the estimated XYZ-tristimulus value of G is $X'_G(j)$, $Y'_G(j)$, $Z'_G(j)$, and the estimated XYZ-tristimulus value of B is $X'_B(j)$, $Y'_B(j)$, $Z'_B(j)$. X, Y and Z in maximum light emission of the white color are calculated by using these values. Then, an average value in a plurality of the image display portions 17 is obtained, and this is denoted as $X_W^{AVE}$, $Y_W^{AVE}$, $Z_W^{AVE}$ as the XYZ-tristimulus value of the target white color.

Gain values $G_R(j)$, $G_G(j)$ and $G_B(j)$ of R, G and B used to reproduce the target white color are calculated by utilizing the following expression.

$$\begin{bmatrix} G_R(j) \\ G_G(j) \\ G_B(j) \end{bmatrix} = \begin{bmatrix} X'_R(j) & X'_G(j) & X'_B(j) \\ Y'_R(j) & Y'_G(j) & Y'_B(j) \\ Z'_R(j) & Z'_G(j) & Z'_B(j) \end{bmatrix}^{-1} \begin{bmatrix} X_W^{AVE} \\ Y_W^{AVE} \\ Z_W^{AVE} \end{bmatrix} \quad (7)$$

where, "j" is a symbol corresponding to each image display portion 17.

With respect to the gain values calculated as described above, final WB (white balance) adjustment coefficients $C_R(j)$, $C_G(j)$ and $C_B(j)$ are determined based on the following expression.

$C_R(j)=G_R(j)/G_G(j)$ $C_G(j)=1.0$ $C_B(j)=G_B(j)/G_G(j)$

A value to be stored in the LUT 82 is obtained by the following procedures. A target value is determined in such a manner that a fixed luminance can be obtained for a predetermined input value for each primary color based on a result of measuring a luminance on the screen of the image display portion 17 for each gray level of each primary color (RGB) when using no LUT 82 (LUT 82 has an output and an input equal to each other). A value obtained by multiplying this target value by the coefficient calculated as described above is determined as a new target value. Then, the target value is set to be an output value with respect to the predetermined input value.

By using the thus obtained LUT, a color difference between images is no longer conspicuous when displaying the white color even if the chromaticity values differ between images for each primary color.

It is to be noted that one LUT 82 is used for each primary color of each image display portion 17 but the area of one image display portion 17 may be divided and one LUT may be used for one divided area. In this case, although the number of the LUTs is increased, correction can be effectively performed if there are color nonuniformities in the plane of the image display portion 17.

As described above, according to the present invention, the tristimulus value measuring means is used only in initial adjustment, and the subsequent adjustment is effected based on a measurement result of the luminance measuring means in the system. Therefore, a user does not have to perform the complicated measurement, thereby greatly reducing the trouble of the correction processing.

Furthermore, according to the present invention, since the measurement can be carried out by using the luminance measuring means without substantially reducing a quantity of light which reaches the screen, the image quality of the displayed image can be prevented from being deteriorated.

Moreover, according to the present invention, since the warning is performed when the correction processing is required due to deterioration in the image quality, a user can be readily aware of the necessity of the correction processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A color correction method of a projection type image display system which projects an image from color image displaying means onto a screen, the method comprising:

a step of measuring an initial XYZ-tristimulus value of an image projected onto the screen at the time of initial adjustment;

a step of measuring an initial luminance value of the image projected onto the screen at the time of initial adjustment;

a step of obtaining a correlation between the initial XYZ-tristimulus value and the initial luminance value;

a step of measuring a maximum luminance value of each of primary colors of an image projected onto the screen upon lapse of a predetermined time from the initial adjustment;

a step of estimating an XYZ-tristimulus value of the image on the screen upon lapse of the predetermined time based on the maximum luminance value and the correlation; and a step of calculating a color correction coefficient based on the estimated XYZ-tristimulus value.

2. A projection type image display system comprising:

color image displaying means for displaying an image to be projected onto a screen;

means for storing a correlation between an initial XYZ-tristimulus value of an image projected onto the screen at the time of initial adjustment and an initial luminance value of the image projected onto the screen at the time of initial adjustment;

luminance measuring means for measuring a maximum luminance value of each of primary colors of an image projected onto the screen upon lapse of a predetermined time from the initial adjustment;

means for estimating an XYZ-tristimulus value of the image on the screen upon lapse of the predetermined time based on the maximum luminance value and the correlation; and means for calculating a color correction coefficient based on the estimated XYZ-tristimulus value.

3. The projection type image display system according to claim 2, wherein the system measures a luminance value by using the luminance measuring means at the end of an operation of the system, and reflects correction based on a measurement result at the start of a next operation of the system.

4. The projection type image display system according to claim 2, wherein an image projected onto the screen from the color image displaying means at the end of an operation of the system includes an image for luminance measurement by the luminance measuring means.

5. The projection type image display system according to claim 2, wherein a series of images projected onto the screen from the color image displaying means include a predetermined image for luminance measurement by the luminance measuring means, and the luminance measuring means measures a luminance value when the predetermined image is displayed.

6. The projection type image display system according to claim 2, wherein a measurement area for the initial XYZ-tristimulus value is substantially the same as a measurement area for the initial luminance value.

7. The projection type image display system according to claim 2, wherein the luminance measuring means includes:
   a plurality of measuring portions; and
   a plurality of filters each of which is provided at a position corresponding to each of the measuring portions and selectively transmits therethrough light in a specific wavelength band.

8. The projection type image display system according to claim 2, wherein the luminance measuring means includes:
   a measuring portion;
   a plurality of filters each of which selectively transmits therethrough light in a specific wavelength band; and
   filter driving means for moving one of the filters to a position corresponding to the measuring portion.

9. The projection type image display system according to claim 2, further comprising processing means for processing an input image signal,
   wherein the processing means includes:
      separating means for separating the input image signal into image signals of primary colors;
      lookup tables to which the separated image signals are inputted; and
      signal generating means for generating an image signal based on output signals of the lookup tables.

* * * * *